United States Patent
Amato (10) Patent No.: US 8,359,146 B2
(45) Date of Patent: Jan. 22, 2013

(54) SINGLE CHANNEL ROLL STABILITY SYSTEM

(75) Inventor: William P. Amato, Avon, OH (US)

(73) Assignee: Bendix Commercial Vehicle Systems LLC, Elyria, OH (US)

( * ) Notice: Subject to any disclaimer, the term of this patent is extended or adjusted under 35 U.S.C. 154(b) by 1000 days.

(21) Appl. No.: 12/126,170

(22) Filed: May 23, 2008

(65) Prior Publication Data

US 2008/0288148 A1 Nov. 20, 2008

Related U.S. Application Data

(63) Continuation-in-part of application No. 11/300,294, filed on Dec. 15, 2005.

(51) Int. Cl.
G06F 7/70 (2006.01)
G06G 7/00 (2006.01)

(52) U.S. Cl. .......................................................... 701/70

(58) Field of Classification Search ................. 701/36, 701/45, 70; 180/282
See application file for complete search history.

(56) References Cited

U.S. PATENT DOCUMENTS

| | | | | |
|---|---|---|---|---|
| 3,668,629 A * | 6/1972 | Pawl | ............................... | 340/453 |
| 5,626,173 A * | 5/1997 | Groult | ............................ | 141/329 |
| 5,825,284 A * | 10/1998 | Dunwoody et al. | ........... | 340/440 |
| 6,176,555 B1 * | 1/2001 | Semsey | ............................... | 303/7 |
| 6,278,930 B1 * | 8/2001 | Yamada et al. | ................... | 701/82 |
| 6,304,805 B1 * | 10/2001 | Onogi | .............................. | 701/36 |
| 6,349,247 B1 * | 2/2002 | Schramm et al. | ................... | 701/1 |
| 6,366,844 B1 * | 4/2002 | Woywod et al. | ................. | 701/83 |
| 6,438,482 B1 * | 8/2002 | Baumann et al. | ............... | 701/70 |
| 6,553,284 B2 * | 4/2003 | Holst et al. | ......................... | 701/1 |
| 6,593,849 B2 | 7/2003 | Chubb et al. | | |
| 6,618,655 B2 | 9/2003 | Tobaru et al. | | |
| 6,756,890 B1 * | 6/2004 | Schramm et al. | .............. | 340/440 |
| 6,834,218 B2 | 12/2004 | Meyers et al. | | |
| 7,040,722 B2 * | 5/2006 | Szabo et al. | .................... | 303/191 |
| 7,079,928 B2 * | 7/2006 | Lu et al. | ............................ | 701/38 |
| 7,132,937 B2 * | 11/2006 | Lu et al. | ......................... | 340/440 |
| 7,302,331 B2 * | 11/2007 | Meyers et al. | .................... | 701/71 |
| 2003/0055549 A1 * | 3/2003 | Barta et al. | ........................ | 701/70 |
| 2003/0236603 A1 * | 12/2003 | Lu | ..................................... | 701/37 |
| 2004/0119335 A1 | 6/2004 | Szabo et al. | | |
| 2004/0183372 A1 | 9/2004 | Heuer et al. | | |
| 2005/0137767 A1 | 6/2005 | Goebels et al. | | |
| 2007/0138865 A1 * | 6/2007 | Amato | ........................... | 303/191 |
| 2008/0288148 A1 * | 11/2008 | Amato | ............................ | 701/70 |

(Continued)

FOREIGN PATENT DOCUMENTS

EP 1 571 058 9/2005

OTHER PUBLICATIONS

Written Opinion of the ISA and International Preliminary Report on Patentability dated Jun. 18, 2008.
International Search Report dated Jun. 20, 2007.

*Primary Examiner* — John Q Nguyen
*Assistant Examiner* — Michael Whalen
(74) *Attorney, Agent, or Firm* — Crowell & Moring LLP (57) ABSTRACT

A method and system for assessing and preventing overturn of a vehicle, the method and system being particularly suitable for use with commercial vehicles with brake systems typically used in North America, wherein a vehicle equipped with single brake pressure modulator is controlled to increase or decrease brake pressure, depending on braking state, to test vehicle wheel speed by response. If the vehicle wheel speed response indicates the inside wheels of the vehicle are off the ground or only lightly loaded, it may be assumed that the vehicle is approaching overturning. A braking intervention may be then executed by the single brake pressure modulator to prevent the incipient overturn event.

18 Claims, 5 Drawing Sheets

U.S. PATENT DOCUMENTS

2009/0240399 A1* 9/2009 Dagenais et al. ............... 701/42
2010/0332098 A1* 12/2010 Kato ............................... 701/72
2010/0332099 A1* 12/2010 Kato ............................... 701/90

* cited by examiner

SINGLE CHANNEL ROLL STABILITY SYSTEM

CROSS REFERENCE TO RELATED APPLICATION

This application is a continuation-in-part application from U.S. application Ser. No. 11/300,294 filed Dec. 15, 2005.

BACKGROUND AND SUMMARY OF THE INVENTION

The present invention relates to vehicle roll control systems, and in particular to vehicle stability systems for detection and prevention of overturning of commercial vehicles, including commercial vehicle trailers.

Commercial vehicles, including the trailers of tractor-trailer vehicles, are frequently loaded with high centers of gravity. During tight turns at highway speeds, these vehicles can roll over. Reducing the vehicle speed when high lateral accelerations are detected or when a wheel is lifted can reduce the tendency for such a vehicle to rollover and improve highway safety.

As described in U.S. Patent Publication No. US 20040119335 A1, the risk of a vehicle overturning event may be estimated by monitoring transverse acceleration (i.e., acceleration lateral to the vehicle's longitudinal axis), and by monitoring vehicle wheel speed during the light application of braking force to the vehicle wheels, and assessing whether the wheels are off the ground or only lightly loaded in the normal direction depending on the resulting wheel speed change.

Roll estimation systems, such as that described in U.S. Patent Publication No. US 20040119335 A1, are based on braking system architectures in which two independent pressure channels exist, with two separate brake application modulators. These systems are derived from two-channel modulator anti-lock braking system ("ABS") architectures, which are common in Europe. The two independent channels permit the independent application of the brakes on each side of the vehicle during the wheel speed monitoring portion of the roll-over risk assessment, so that differential wheel speed change comparisons may be made.

In contrast to European practice, North American trailer ABS systems are predominantly based on a single pressure channel system, in which a single brake application modulator serves the vehicle wheels on both sides of at least one vehicle axle, i.e., a "single channel" system. This is in part due to the additional costs associated with providing two independent channels. In the absence of a second independent pressure channel, it has been commonly assumed that the known two-channel roll assessment and prevention systems could not be used with single-channel North American-type commercial vehicles.

In addressing these and other objectives, the present invention provides a vehicle roll stability system architecture in which the roll stability function is performed with a single modulator controlling brake application on both left and right side wheels on one or more axles, thereby providing the benefits of the more complicated and more costly two-channel roll estimation systems in a simpler and lower cost system which is compatible with North American-type single channel commercial vehicle ABS systems.

This objective is met by providing a trailer roll stability system comprising a single-channel pressure modulator and wheel sensors (including single-channel architectures commonly known as "2s1m" (two sensors, one modulator) or "4s1m" (four sensors, one modulator)), and an electronic control system. The electronic control system evaluates vehicle speed, lateral acceleration and wheel speed change information, and controls brake pressure application during roll evaluation operation. However, unlike prior practice two-channel systems in which brake pressure is applied to different wheels independently, the electronic control system of the present invention controls the single brake pressure modulator to lightly apply the brakes simultaneously at all the wheels.

The Applicant has discovered through experimentation that contrary to previous assumptions, a single-channel braking system can be used with a roll detection and prevention system while providing anti-roll performance which is as good or better than comparable two-channel systems.

With the high lateral acceleration, the vehicle weight is transferred to the outside wheels and the inside wheels may lift off of the ground if the center of gravity is high. In a prior two-channel system, if there has been no application of a brake intervention (e.g., brake application by the vehicle operator or as a result of a brake system-commanded braking event), when there is a high lateral acceleration the two-channel system executes a "pressure test" mode, applying a small test pressure only to the brakes on the side of the vehicle inside the turn (i.e., using only the pressure modulator in the channel which controls the inside wheel brakes). If the small pressure applied in the one channel causes the inside wheels to lock, it may be assumed that the inside wheels are off of the ground or only very lightly loaded.

In the inventive single-channel system, it has been found that the small test pressure may be simultaneously applied to both the inside and outside wheels without significant detriment. Testing confirmed that in a vehicle such as a trailer equipped with a single brake pressure modulator controlling all the vehicle brakes, the test pressure application could be used to reliably determine whether the inside wheels were off of the ground or very lightly loaded, as the test pressure is too small to significantly affect the rotation of the outside wheels which were heavily loaded.

On the other hand, in the above-described two-channel system during a braking intervention the system applies the brakes in the channel controlling the brakes on the outside wheels, as the outside wheels carrying the greatest portion of the vehicle weight in a turn (these wheels therefore possessing the greatest capacity to slow the vehicle since the higher normal force on the outside wheels allows higher braking forces to be applied before the wheels lock-up and slide). Brake pressure is not applied to the channel for the inside wheels due to concerns with the potential for inside wheel lock-up and excessive tire wear (e.g., "flat-spotting").

Where it has been previously assumed that pressure should only be applied to the outside wheels during braking intervention in two-channel braking systems, it has been discovered that the application of braking system pressure in a single-channel system to both the inside and outside wheels provides the desired anti-roll performance and permits roll detection testing may still be performed, without significant negative consequences.

During a braking event, rather than applying a test pressure to the inside wheels, the electronic control unit momentarily slightly reduces the applied brake pressure while monitoring the wheel speed of the inside wheels. If the inside wheel speeds remain at zero, it can be assumed that the wheels are off the ground. Alternatively, if the inside wheel speeds substantially increase, it can be assumed that the inside wheels are only lightly loaded as they were locked or nearly locked before the brake pressure was reduced. As a further alternative, if after the test pressure is removed (i.e., the brake pressure is restored to its pre-test value), the inside wheel speeds substantially decrease or decrease faster than the outer wheel speeds, it also can be assumed that the inside wheels are only lightly loaded as they were locked or nearly locked before the brake pressure was reduced.

On the other hand, if braking is not occurring, a slight test pressure may be applied by the single channel system to all of the wheels while monitoring the wheel speed of the inside wheels. If the wheel speed substantially decreases or decreases faster than the outer wheel speeds, it can be assumed that the wheels are off the ground or only lightly loaded. Alternatively, if after the test pressure is removed (i.e., the brake pressure is restored to its pre-test value of zero pressure), if the inside wheel speeds substantially increase or increase faster than the outer wheel speeds, it also can be assumed that the inside wheels are only lightly loaded but not off the ground as they were locked or nearly locked when the test brake pressure was applied.

With these observations, the existence of the potential for overturning may be deduced. It was noted that while the application of brake pressure in a single-channel system may result in momentary skidding of the inside wheels (due to the lack of independent operation possible with two-channel systems), the potential for increased tire wear or "flat-spotting" during braking is substantially outweighed by the more pressing need to prevent a vehicle overturning event. The potential for increased tire wear was also offset by unanticipated improvements in overall braking performance observed in testing, where even sliding inside wheels contributed to the deceleration of the vehicle during brake application (as compared to braking without application of inside wheel brakes in a two-channel system). Thus, whether the brakes are or are not being applied, a single-channel (single brake pressure modulator) braking system was found to provide effective roll detection and anti-roll braking performance comparable to previous two-channel systems, at lower cost and with a simpler system architecture.

Other objects, advantages and novel features of the present invention will become apparent from the following detailed description of the invention when considered in conjunction with the accompanying drawings.

DETAILED DESCRIPTION OF THE DRAWINGS

Figure 1:
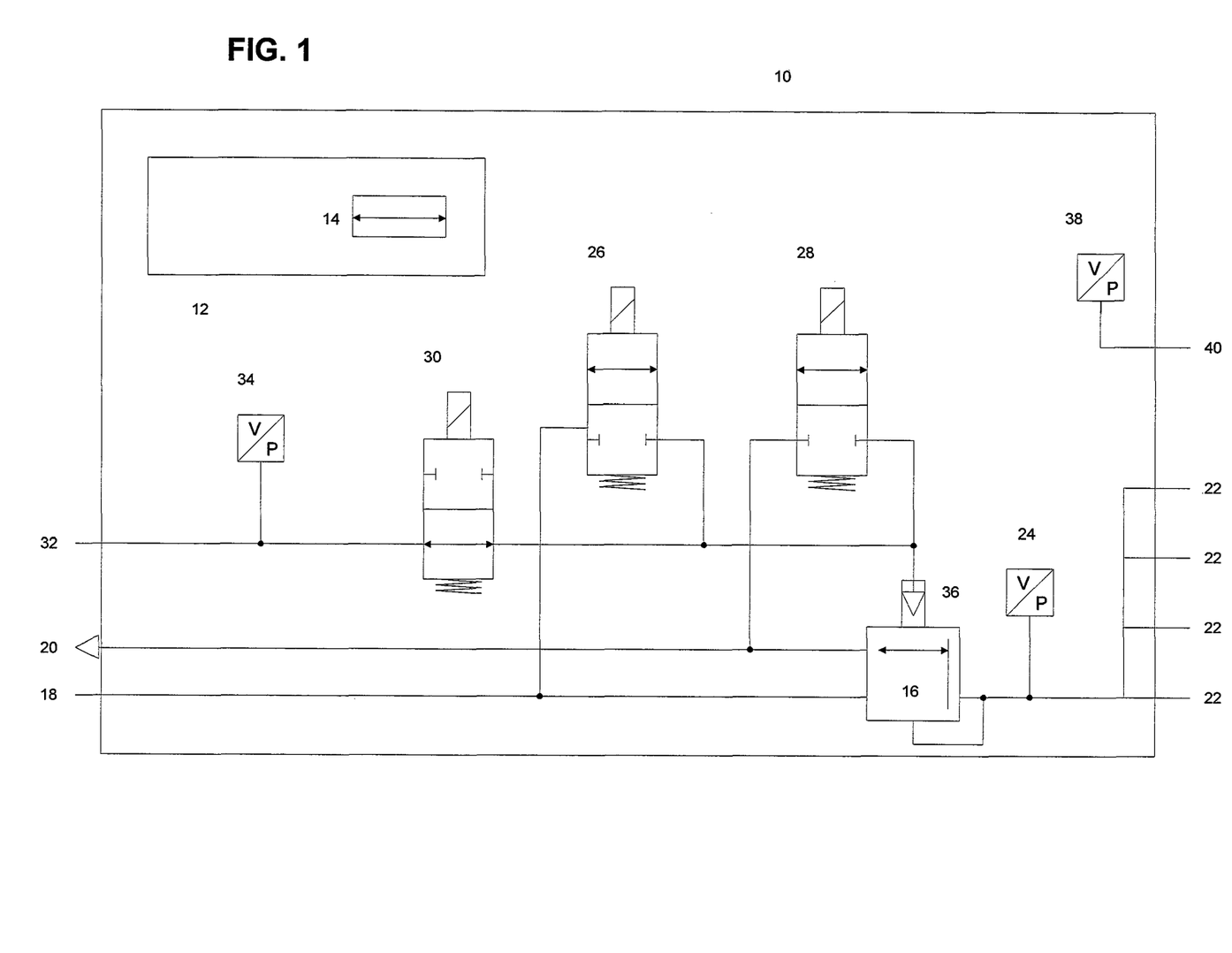
FIG. 1 is a schematic illustration of a single channel roll stability system in accordance with an embodiment of the present invention.

FIG. 1 schematically illustrates an example embodiment of single channel roll stability system. In this embodiment, all the primary components, including solenoids, pressure sensors, and an accelerometer are packaged into a single module 10. The module includes an electronic control unit 12 ("ECU"). The ECU 12 houses a lateral acceleration sensor 14, whose output is monitored by ECU 12.

The module 10 also includes a brake pressure modulator relay valve 16, which controls the flow of control air through air supply connection 18 and air exhaust connection 20 to and from the vehicle's individual brake actuators 22. The pressure in the lines from the modulator 16 to the brake actuators is monitored by a delivery pressure sensor 24, shown in this embodiment located inside module 10.

Operation of modulator relay valve 16 is controlled in a conventional manner by supply solenoid 26, exhaust solenoid 28, and hold solenoid 30 (solenoid 30 controlling flow through brake demand line 32, which is monitored by brake demand pressure sensor 34). Each of the solenoids 26, 28 and 30 connect their respective supply, exhaust and brake demand lines to the control portion 36 of pressure modulator 16 in order to command the positioning of modulator 16 to apply or relieve pressure in the lines to the brake actuators 22.

The module 10 further includes an air suspension pressure sensor 38, which detects the air pressure within the vehicle's suspension system, from which the load 40 carried by the suspension may be determined. The pressure sensor 38 alternatively may be located outside the module 10.

For clarity, the electrical connections to the solenoids and between the ECU and the various sensors in the system are not illustrated.

In operation, the single-channel roll control system functions in a manner similar to existing two-channel systems, except that all brake application actions are performed on all brakes simultaneously through modulator 16. Accordingly, when a lateral acceleration is detected, rather than applying a small test pressure only to the inside wheels to assess whether the inside wheels are off the ground or only lightly loaded, in this single channel embodiment, all four brake actuators 22 are affected by the ECU's operation, via the appropriate solenoid, of modulator 16. Similarly, when ECU 12 is controlling an anti-overturning intervention event, i.e., applying the brakes to attempt to prevent an incipient vehicle roll-over, rather than the two-channel system's application of the brakes only on the most-heavily loaded outside wheels (thereby avoiding lock-up of the inside wheels), ECU 12's operation of modulator 16 results in brake application of all the vehicle brakes, without regard as to whether the inside wheels have, or will, lock.

One of ordinary skill in the art will recognize that the particular packaging of the components in the inventive system is not important, but rather that the design includes only one pressure modulator relay valve. For example, the air suspension pressure sensor 38 may be remotely connected, with wiring connecting the sensor to the module. Similarly, the delivery pressure sensor 24 and/or the lateral acceleration sensor 14 may be remotely located and connected by wiring. A further alternative includes replacement of the suspension pressure detection by deflection or load measurement, or elimination of direct measurement altogether if an estimate of load is provided in the ECU programming. Regardless of the specific arrangement of the components, which may be varied as needed to suit the vehicle application embodiment, a single brake pressure modulator simultaneously controls actuation of the vehicle's brakes.

Figure 2:
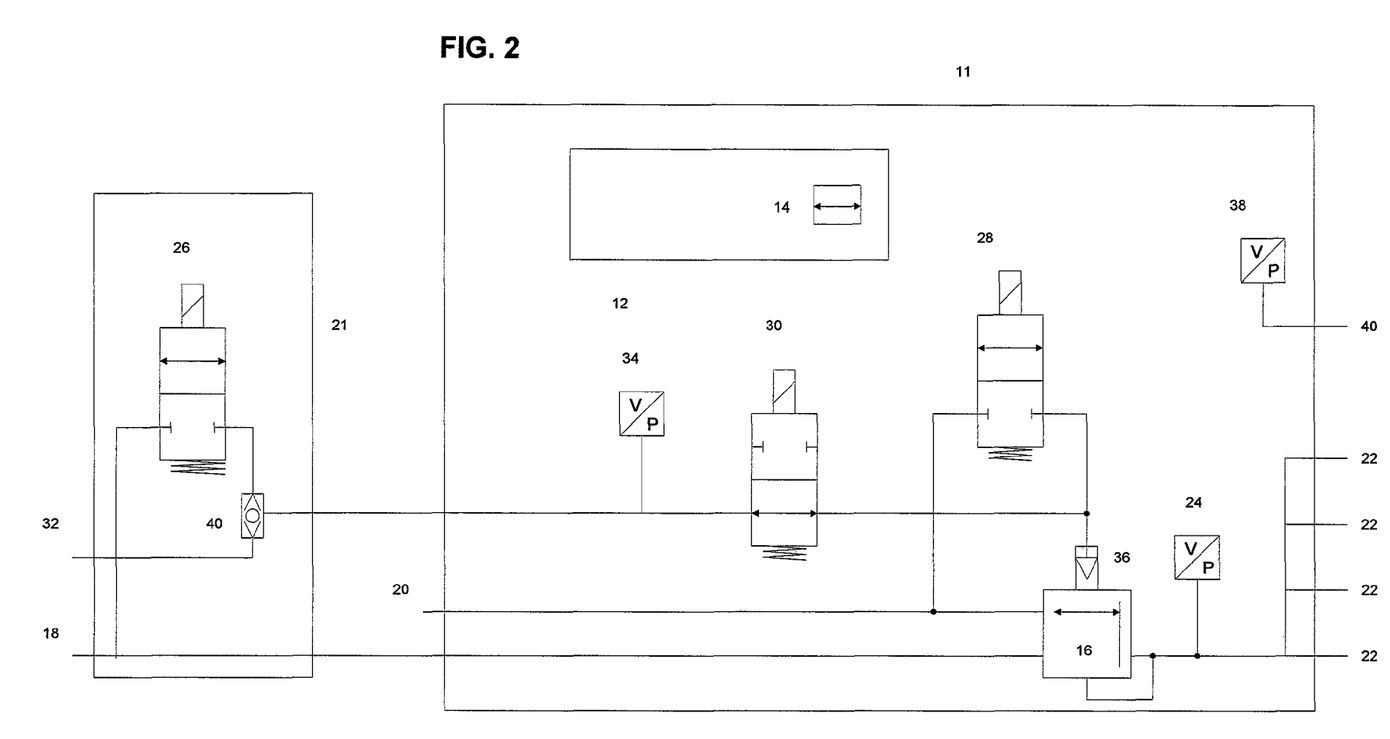
FIG. 2 is a schematic illustration of a single channel roll stability system in accordance with another embodiment of the present invention.

FIG. 2 illustrates an alternative embodiment of the present single channel roll control system, in which two modules are provided. The use of multiple modules permits individual modules to be located at different places on the vehicle to optimize the installation. In this embodiment, one module 21 contains the supply solenoid 26 previously located within module 10 in FIG. 1 (e.g., a solenoid like a traction control solenoid), along with a double check valve 40 which ensures the appropriate flow in the supply and brake demand lines is maintained. The other module 11 otherwise substantially corresponds to module 10 in FIG. 1, less the supply solenoid 26. This module 11 is much like the Model No. TABS6 premium module, available from Bendix Commercial Vehicle Systems, LLC of Elyria, Ohio. As with the embodiment in FIG. 1, this embodiment also relies on a single pressure modulator 16 simultaneously controlling flow to/from the brake actuators 22.

Figure 3:
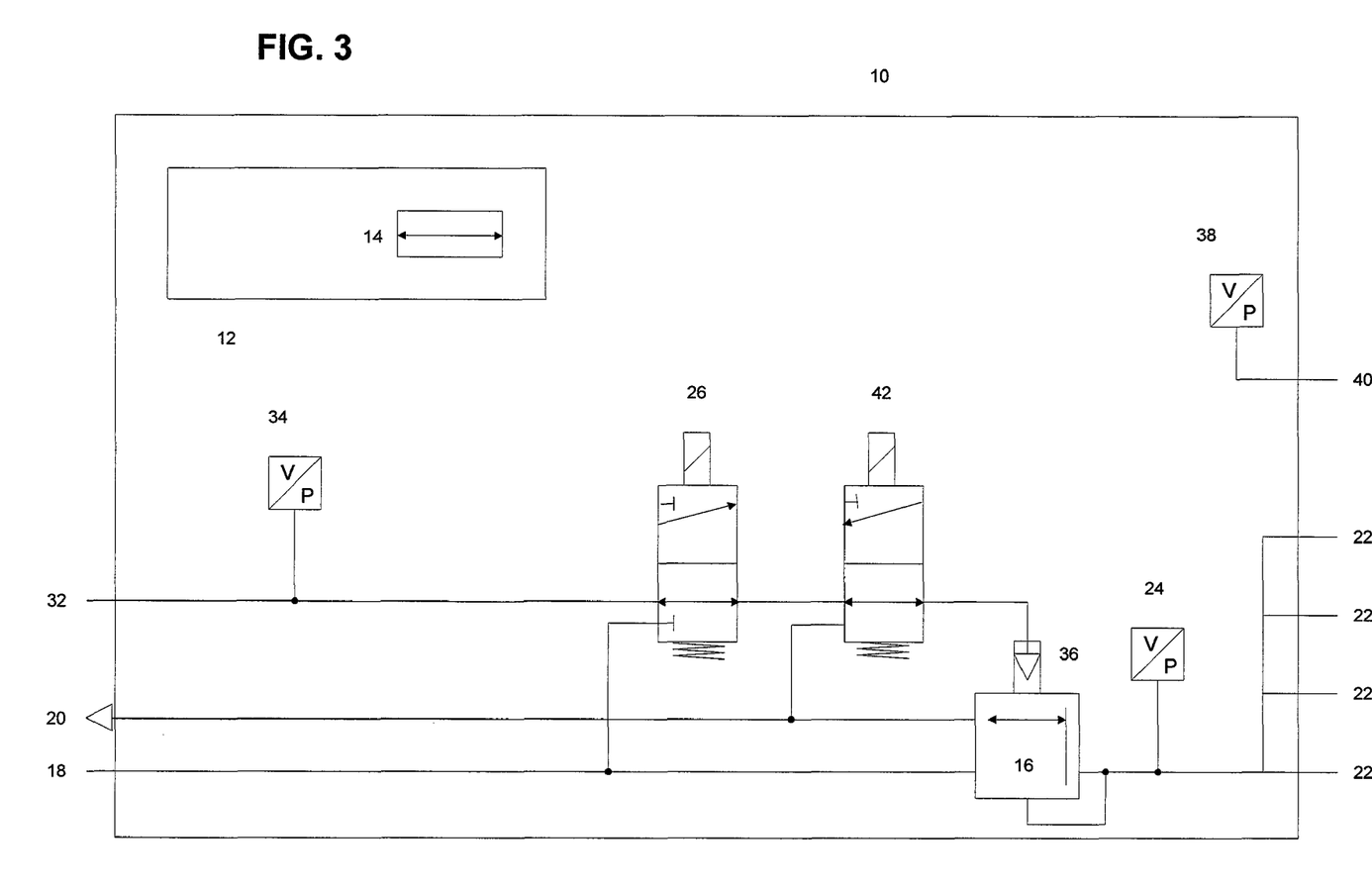
FIG. 3 is a schematic illustration of a single channel roll stability system in accordance with a further embodiment of the present invention.

In the embodiment shown in FIG. 3, two so-called "3-by-2" solenoids valves may be used to simplify the design of the module, albeit while requiring more complicated solenoid valves. Rather than using the separate supply, exhaust and hold solenoids 26, 28 and 30 in FIG. 1, there are provided a 3-by-2 supply solenoid 26, and a 3-by-2 control solenoid 42. The 3-by-2 supply solenoid in this embodiment can switch between the supply air 18 or the control air 32. The solenoid is connected to the control air by default here. The control solenoid 42 can switch between exhaust and either the supply or control air, as determined by the switching state of supply solenoid 26. Additionally, a special control mode of the control solenoid may be used to smoothly apply pressure and produced hold states when required. As in the other embodiments, this variation maintains the single-channel modulator control of brake actuation.

Figure 4A:
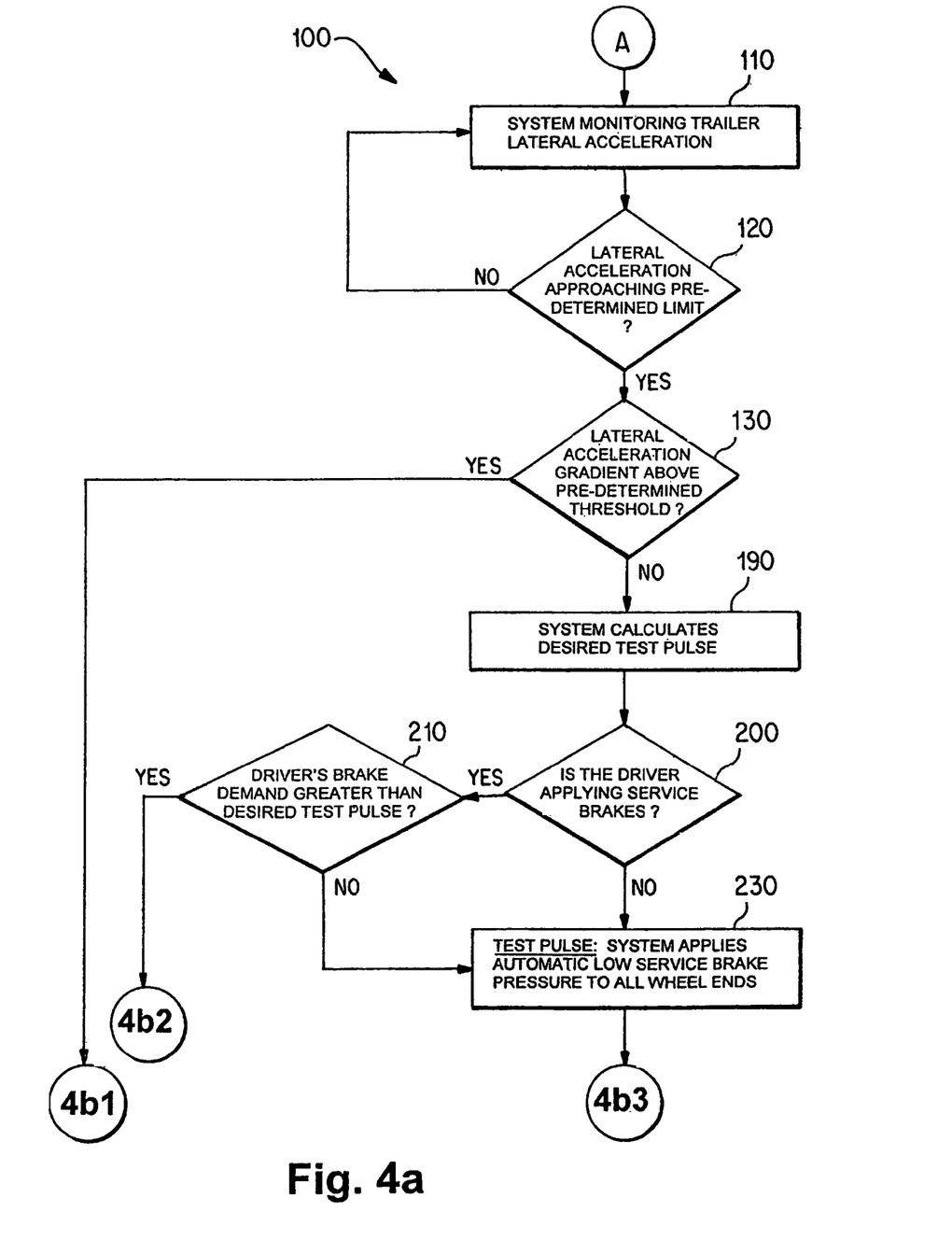
FIGS. 4a and 4b is a flow chart for determining roll stability with a single channel roll stability system in accordance with an embodiment of the present invention.
Figure 4B:
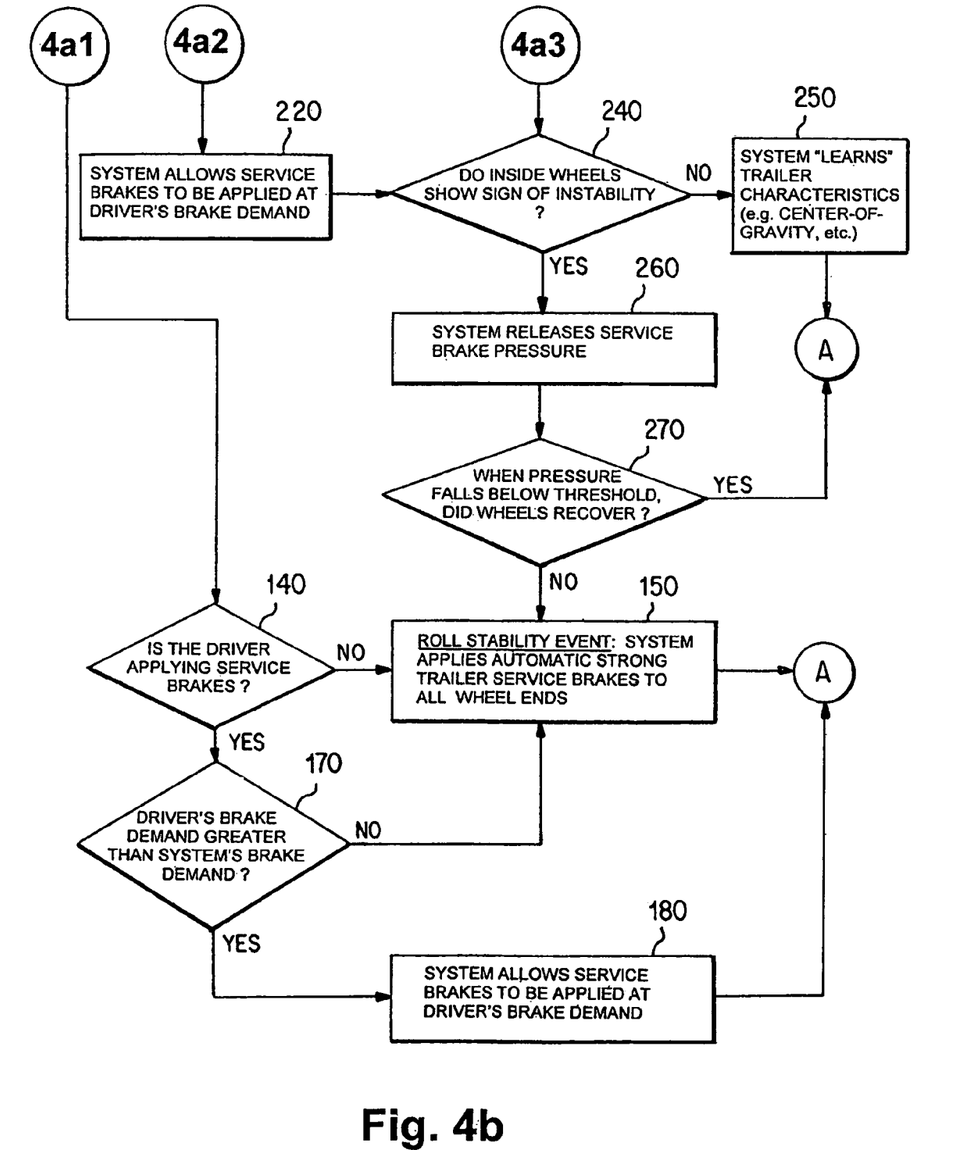

FIG. 4 illustrates an example logic for operation of an embodiment of the present single-channel roll stability system. From the initial starting point 100, the system monitors trailer lateral acceleration at step 110. At step 120, a determination is made as to whether the lateral acceleration is approaching a pre-determined limit. If the pre-determined lateral acceleration limit has not been approached, control is returned to step 110 for further lateral acceleration monitoring. If it is determined that the pre-determined lateral acceleration level is being approached, a determination is made at step 130 whether the lateral acceleration gradient is above a pre-determined threshold. If the lateral acceleration gradient is above the predetermined threshold, at step 140 a determination is made as to whether the driver is applying the vehicle's service brakes. If the driver is not applying the service brakes, it is determined that a roll stability event is occurring and at step 150 the braking system applies automatic strong trailer service brakes to all wheels, and shifts control back to the beginning of the routine "A" at step 100. If, on the other hand, it is determined at step 140 that the driver is applying the vehicle's service brakes, then at step 170 it is determined whether the driver's brake demand is greater than the brake system's brake demand for the test pulse. If the driver's brake demand is higher, then the brake system defers to the driver, allowing at step 180 for the service brakes to be applied at the level of the driver's brake demand. Conversely, if the driver's brake demand is not greater than the brake system's demand, then a roll stability event is determined to be occurring and the application of strong brakes at step 150 is initiated.

Alternatively, if at step 130 it is determined that the lateral acceleration gradient is not above the pre-determined threshold, then at step 190 the brake system calculates a desired test pulse, and at step 200 it is determined whether the driver is presently applying the vehicle's service brakes. If the driver is applying the service brakes, at step 210 it is determined whether the driver's brake demand is greater than the desired test pulse calculated in step 190. If the driver's demand is greater than the test pulse, the brake system at step 220 permits the brakes to be applied in accordance with the driver's brake demand. If, on the other hand, the driver's brake demand is determined in step 210 to not be greater than the desired test pulse, then at step 230 the brake system applies a test pulse to the service brakes. The test pulse applied in step 230 may be a pressure increase or a pressure decrease, depending on the state of braking, i.e., if the brakes are not being applied, a positive pressure is applied to the brakes, whereas if the brakes are already being applied, the brake pressure is slightly decreased to generate the test pulse.

Based on the results of the test pulse applied in step 230, or in the event the service brakes are being applied in accordance with the driver's demand in step 220, a determination is made at step 240 whether the inside wheels show sign of instability (i.e., an assessment of inside wheel speed increase or decrease is made, taking into account whether the brakes were being applied before the test pulse was applied). If no instability is found, at step 250 the brake system "learns" the handling characteristics of the trailer, for example, by storage of braking event data for further use in roll stability determinations.

If, however, it is determined at step 240 that the inside wheels show signs of instability, at step 260 the brake system releases the service brake pressure applied by the test pulse (i.e., restores the brake pressure by either releasing an applied pressure or returning the reduced pressure back to the previous applied pressure), an assessment is made at step 270 whether, on restoration of the brake pressure the inside wheels recover. The inside wheels are judged to not have recovered if: (i) starting from the state where the brakes were applied, the wheel speed of the inside wheels decrease at a greater rate than the wheels on an outside side of the vehicle; or (ii) starting from the state where the brakes were not applied, the wheel speed of the inside wheels increase at a greater rate than the wheels on an outside side of the vehicle. If the wheels are determined in step 270 to not have recovered following restoration of pressure after removal of the test pulse, then control is shifted to step 150 and automatic strong service brake application is initiated. Otherwise, if the wheels are determined in step 270 to have recovered, system control is returned to step 100 to restart the control routine.

The foregoing disclosure has been set forth merely to illustrate the invention and is not intended to be limiting. For example, in the figures a single relay modulator is shown. Rather then use of a single relay modulator, a modulator such as Model No. M32 modulator, available from Bendix Commercial Vehicle Systems, LLC could be used in series with a relay valve. While such an arrangement would not be as efficient from cost or installation space utilization points of view, it nonetheless would provide the single channel system functionality of the present invention. Further, this invention is not limited to commercial vehicles such as semi-trailers, but rather may be applied to other applications, such lighter duty trailer systems, including horse trailers, construction equipment transport trailers, and recreational vehicles (including camper trailers). Because other such modifications of the disclosed embodiments incorporating the spirit and substance of the invention may occur to persons skilled in the art, the invention should be construed to include everything within the scope of the appended claims and equivalents thereof.

What is claimed is:

1. A method of assessing whether a vehicle equipped with a plurality of wheel brakes is about to overturn, the vehicle including a trailer equipped with a single-channel brake pressure modulator arranged to control actuation of all the trailer brakes, comprising the acts of:

determining a lateral acceleration of the vehicle;
determining a rotational wheel speed of the vehicle wheels;
when the lateral acceleration exceeds a predetermined threshold, conducting a rotational wheel speed change test, wherein the test includes if the vehicle is not being braked, applying a brake pressure to the vehicle brakes with the single-channel brake pressure modulator, or if the vehicle is being braked, lowering a brake pressure being applied by the single-channel brake pressure modulator;

after applying or lowering the brake pressure, monitoring the wheel speed behavior of the vehicle wheels on an inside side of the vehicle, said inside side being the side facing away from the lateral acceleration direction;

restoring brake pressure to the brake pressure existing before the rotational wheel speed test; and determining based on monitored wheel speed behavior following the restoring brake pressure step whether the vehicle is about to overturn.

2. The method of claim 1, wherein if the vehicle is not being braked, after the brake pressure restoring step the vehicle is determined to be about to overturn when the wheel speed of the inside wheels increase at a greater rate than the wheels on an outside side of the vehicle.

3. The method of claim 1, wherein if the vehicle is being braked, after the brake pressure restoring step the vehicle is determined to be about to overturn when the wheel speed of the inside wheels decrease at a greater rate than the wheels on an outside side of the vehicle.

4. A method of preventing overturning of a vehicle equipped with a plurality of wheel brakes, the vehicle including a trailer equipped with a single-channel brake pressure modulator arranged to control actuation of all the trailer brakes, comprising the acts of:

determining a lateral acceleration of the vehicle;

determining a rotational wheel speed of the vehicle wheels;

when the lateral acceleration exceeds a predetermined threshold, conducting a rotational wheel speed change test, wherein the test includes if the vehicle is not being braked, applying a brake pressure to the vehicle brakes with the single-channel brake pressure modulator, or if the vehicle is being braked, lowering a brake pressure being applied by the single-channel brake pressure modulator;

after applying or lowering the brake pressure, monitoring the wheel speed behavior of the vehicle wheels on an inside side of the vehicle, said inside side being the side facing away from the lateral acceleration direction;

restoring brake pressure to the brake pressure existing before the rotational wheel speed test;

determining based on monitored wheel speed behavior following the restoring brake pressure step whether the vehicle is about to overturn; and applying the vehicle brakes to decrease vehicle speed when it is determined that the vehicle is about to overturn.

5. The method of claim 4, wherein if the vehicle is not being braked, after the brake pressure restoring step the vehicle is determined to be about to overturn when the wheel speed of the inside wheels increase at a greater rate than the wheels on an outside side of the vehicle.

6. The method of claim 4, wherein if the vehicle is being braked, after the brake pressure restoring step the vehicle is determined to be about to overturn when the wheel speed of the inside wheels decrease at a greater rate than the wheels on an outside side of the vehicle.

7. A vehicle overturn assessment system for assessing whether a vehicle including a trailer equipped with a plurality of wheel brakes is about to overturn, comprising:

a vehicle lateral acceleration sensor;

a plurality of vehicle wheel speed sensors for sensing rotational wheel speed of at least one wheel on each lateral side of a vehicle;

a single-channel brake pressure modulator arranged to control actuation of all the trailer wheel brakes; and a control unit, wherein the control unit is programmed to monitor signals generated by the lateral acceleration sensor and the wheel speed sensors, monitor whether the single-channel brake pressure modulator is applying braking pressure, and command the single-channel brake pressure modulator to apply braking pressure, and wherein the control unit is programmed to assess whether a vehicle overturn event is about to occur by determining whether a lateral acceleration sensed by the lateral acceleration sensor exceeds a predetermined threshold, determining the rotational wheel speed of at least the at least one wheel on each lateral side of a vehicle, conducting a rotational wheel speed change test when the lateral acceleration exceeds the predetermined threshold, wherein the test includes if the vehicle is not being braked, applying a brake pressure to the vehicle brakes with the single-channel brake pressure modulator, or if the vehicle is being braked, lowering a brake pressure being applied by the single-channel brake pressure modulator, after applying or lowering the brake pressure, monitoring the wheel speed behavior of the vehicle wheels on an inside side of the vehicle, said inside side being the side facing away from the lateral acceleration direction;

restoring brake pressure to the brake pressure existing before the rotational wheel speed test; and determining based on monitored wheel speed behavior following the restoring brake pressure step whether the vehicle is about to overturn.

8. The method of claim 7, wherein if the vehicle is not being braked, after the brake pressure restoring step the vehicle is determined to be about to overturn when the wheel speed of the inside wheels increase at a greater rate than the wheels on an outside side of the vehicle.

9. The method of claim 7, wherein if the vehicle is being braked, after the brake pressure restoring step the vehicle is determined to be about to overturn when the wheel speed of the inside wheels decrease at a greater rate than the wheels on an outside side of the vehicle.

10. A vehicle overturn prevention system for assessing and preventing the overturn of a vehicle including a trailer equipped with a plurality of wheel brakes, comprising:

a vehicle lateral acceleration sensor;

a plurality of vehicle wheel speed sensors for sensing rotational wheel speed of at least one wheel on each lateral side of a vehicle;

a single-channel brake pressure modulator arranged to control actuation of all the trailer wheel brakes; and a control unit, wherein the control unit is programmed to monitor signals generated by the lateral acceleration sensor and the wheel speed sensors, monitor whether the single-channel brake pressure modulator is applying braking pressure, and command the single-channel brake pressure modulator to apply braking pressure, and wherein the control unit is programmed to assess and prevent a vehicle overturn event by determining whether a lateral acceleration sensed by the lateral acceleration sensor exceeds a predetermined threshold, determining the rotational wheel speed of at least the at least one wheel on each lateral side of a vehicle, conducting a rotational wheel speed change test when the lateral acceleration exceeds the predetermined threshold, wherein the test includes if the vehicle is not being braked, applying a brake pressure to the vehicle brakes with the single-channel brake pressure modulator, or if the vehicle is being braked, lowering a brake pressure being applied by the single-channel brake pressure modulator, after applying or lowering the brake pressure, monitoring the wheel speed behavior of the vehicle wheels on an inside side of the vehicle, said inside side being the side facing away from the lateral acceleration direction;

restoring brake pressure to the brake pressure existing before the rotational wheel speed test;

determining based on monitored wheel speed behavior following the restoring brake pressure step whether the vehicle is about to overturn; and commanding the single-channel brake pressure modulator to apply the vehicle brakes to decrease vehicle speed when it is determined that the vehicle is about to overturn.

11. The method of claim 10, wherein if the vehicle is not being braked, after the brake pressure restoring step the vehicle is determined to be about to overturn when the wheel speed of the inside wheels increase at a greater rate than the wheels on an outside side of the vehicle.

12. The method of claim 10, wherein if the vehicle is being braked, after the brake pressure restoring step the vehicle is determined to be about to overturn when the wheel speed of the inside wheels decrease at a greater rate than the wheels on an outside side of the vehicle.

13. A control unit for a vehicle overturn assessment system for assessing whether a vehicle including a trailer equipped with a plurality of wheel brakes is about to overturn, wherein:

the control unit is arranged to communicate with a vehicle lateral acceleration sensor, a plurality of vehicle wheel speed sensors for sensing rotational wheel speed of at least one wheel on each lateral side of a vehicle and a single-channel brake pressure modulator arranged to control actuation of the vehicle wheel brakes, and the control unit is programmed to monitor signals generated by the lateral acceleration sensor and the wheel speed sensors, monitor whether the single-channel brake pressure modulator is applying braking pressure, command the single-channel brake pressure modulator to apply braking pressure, and to assess whether a vehicle overturn event is about to occur by determining whether a lateral acceleration sensed by the lateral acceleration sensor exceeds a predetermined threshold, determining the rotational wheel speed of at least the at least one wheel on each lateral side of a vehicle, conducting a rotational wheel speed change test when the lateral acceleration exceeds the predetermined threshold, wherein the test includes if the vehicle is not being braked, applying a brake pressure to the vehicle brakes with the single-channel brake pressure modulator, or if the vehicle is being braked, lowering a brake pressure being applied by the single-channel brake pressure modulator, after applying or lowering the brake pressure, monitoring the wheel speed behavior of the vehicle wheels on an inside side of the vehicle, said inside side being the side facing away from the lateral acceleration direction;

restoring brake pressure to the brake pressure existing before the rotational wheel speed test; and determining based on monitored wheel speed behavior following the restoring brake pressure step whether the vehicle is about to overturn.

14. The control unit of claim 13, wherein if the vehicle is not being braked, after the brake pressure restoring step the vehicle is determined to be about to overturn when the wheel speed of the inside wheels increase at a greater rate than the wheels on an outside side of the vehicle.

15. The control unit of claim 13, wherein if the vehicle is being braked, after the brake pressure restoring step the vehicle is determined to be about to overturn when the wheel speed of the inside wheels decrease at a greater rate than the wheels on an outside side of the vehicle.

16. A vehicle overturn assessment system for assessing whether a vehicle including a trailer equipped with a plurality of wheel brakes is about to overturn, comprising:

a vehicle lateral acceleration sensor;

a plurality of vehicle wheel speed sensors for sensing rotational wheel speed of at least one wheel on each lateral side of a vehicle;

a single-channel brake pressure modulator arranged to control actuation of all the trailer brakes; and a control unit, wherein the control unit is programmed to monitor signals generated by the lateral acceleration sensor and the wheel speed sensors, monitor whether the single-channel brake pressure modulator is applying braking pressure, and command the single-channel brake pressure modulator to apply braking pressure, and wherein the control unit is programmed to assess whether a vehicle overturn event is about to occur by determining whether a lateral acceleration sensed by the lateral acceleration sensor exceeds a predetermined threshold, determining the rotational wheel speed of at least the at least one wheel on each lateral side of a vehicle, conducting a rotational wheel speed change test when the lateral acceleration exceeds the predetermined threshold, wherein the test includes if the vehicle is not being braked, applying a brake pressure to the vehicle brakes with the single-channel brake pressure modulator, or if the vehicle is being braked, lowering a brake pressure being applied by the single-channel brake pressure modulator, after applying or lowering the brake pressure, monitoring the wheel speed behavior of the vehicle wheels on an inside side of the vehicle, said inside side being the side facing away from the lateral acceleration direction;

restoring brake pressure to the brake pressure existing before the rotational wheel speed test; and determining based on monitored wheel speed behavior following the restoring brake pressure step whether the vehicle is about to overturn.

17. The system of claim 16, wherein if the vehicle is not being braked, after the brake pressure restoring step the vehicle is determined to be about to overturn when the wheel speed of the inside wheels increase at a greater rate than the wheels on an outside side of the vehicle.

18. The system of claim 16, wherein if the vehicle is being braked, after the brake pressure restoring step the vehicle is determined to be about to overturn when the wheel speed of the inside wheels decrease at a greater rate than the wheels on an outside side of the vehicle.

* * * * *